United States Patent [19]

Lee

[11] Patent Number: 5,008,576

[45] Date of Patent: Apr. 16, 1991

[54] MAGNETIZING TYPE INDUCTION MOTOR

[75] Inventor: Jong-Seob Lee, InChon, Rep. of Korea

[73] Assignees: Jong-Sub Lee; Woo-Jin Kim, both of Seoul, Rep. of Korea

[21] Appl. No.: 324,217

[22] Filed: Mar. 15, 1989

[30] Foreign Application Priority Data

Mar. 16, 1988 [KR] Rep. of Korea ............... 2769/1988

[51] Int. Cl.$^5$ .................... H02K 17/12; H02K 1/12
[52] U.S. Cl. ..................................... 310/166; 310/254
[58] Field of Search ............... 310/40 MM, 154, 261, 310/181, 166, 254

[56] References Cited

U.S. PATENT DOCUMENTS 3,939,371 2/1976 Mura-Kami .................... 310/154
4,619,588 10/1986 Moore, III ................... 310/154
4,774,426 9/1988 Mohr et al. ................... 310/154

Primary Examiner—Steven L. Stephan
Assistant Examiner—C. LaBalle
Attorney, Agent, or Firm—Marshall & Melhorn

[57] ABSTRACT

A magnetizing type induction motor includes a conventional rotor enclosed within a novel stator. The stator has a pair of crescent-shaped pole pieces, the thickness of the stator pieces at their centers being larger than the thickness at the opposite edges thereof. These stator pieces are secured together by a pair of end cover plates which are provided with fitting grooves for receiving the stator pieces, and coupling pins are installed between the facing edges of the stator pieces. This magnetizing type induction motor is easily miniaturized and is not subject to frequent failures so that it can be reliably used in automated apparatuses.

11 Claims, 3 Drawing Sheets

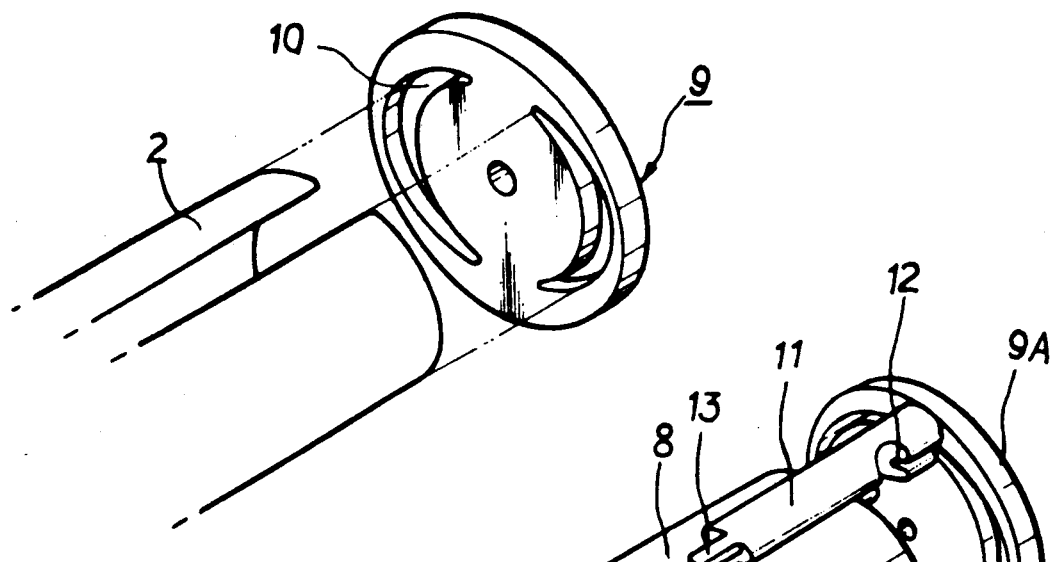
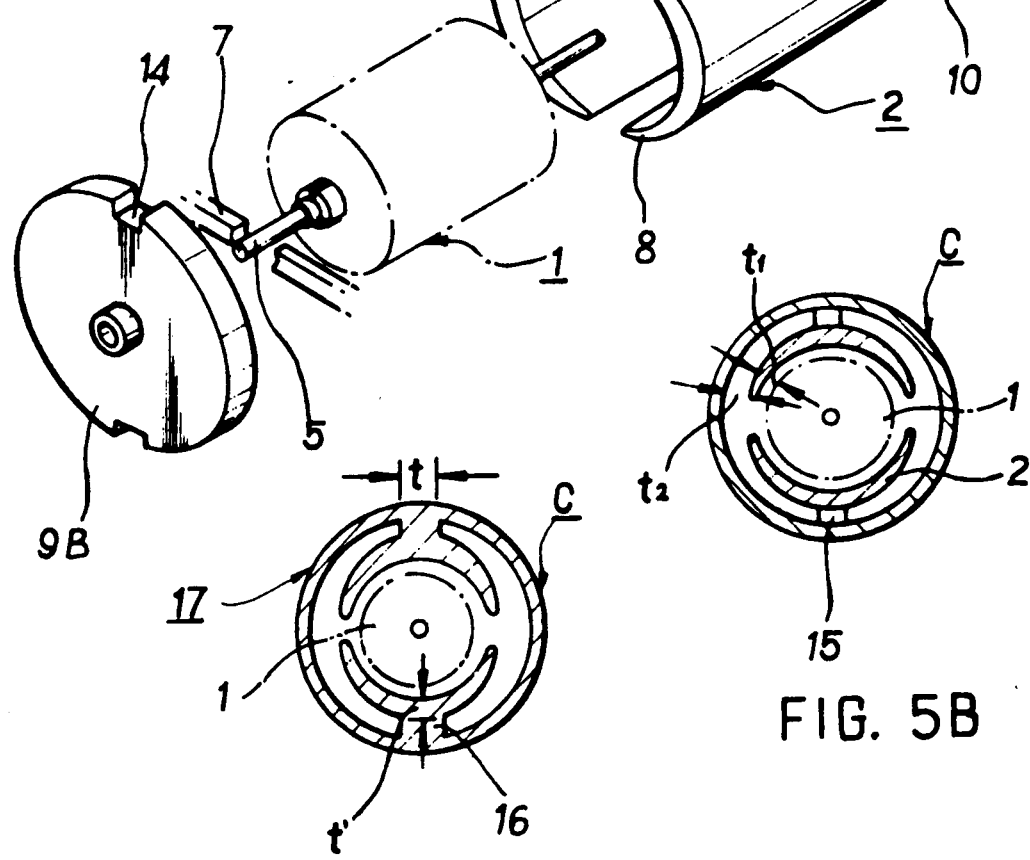

MAGNETIZING TYPE INDUCTION MOTOR

FIELD OF THE INVENTION

The present invention relates to an electric motor, and particularly to a magnetizing type induction motor in which the structure is simple, the actuation is sure without fail, and miniaturization is possible.

BACKGROUND OF THE INVENTION

In the conventional electric motor as shown in FIG. 1A, the construction is such that a stator 22 consisting of a stator core 28 and the stator coils 29 is provided, a rotor 21 consisting of a rotor core 23 and rotor coils 24 installed on a shaft 25 is provided within the stator 22, and a commutator 26 having as many poles as the number of the poles of the rotor is installed fixedly to the rotor shaft. The motor is operated by supplying an electric current through a brush 27 and the commutator 26 to the rotor coils 24 (this is the so-called straight wound motor). But in this type of motor, the electric current has to be supplied both to the stator and to the rotor, and therefore, the motor is very complicated, with the result that its volume and weight become very large, and that it is difficult to miniaturize the motor. Further, the motor is susceptible to failures, and therefore, difficulties are created in the maintenance of the motor.

Meanwhile, there is another type of conventional electric motor in which a coilless rotor 31 has a core mounted on a shaft 35 and installed within a stator 32 having ring coils 40 and a stator coil 39 as shown in FIG. 1B. This is an induction motor having a simple structure to a certain extent, but this type of motor is also difficult to miniaturize, in addition to the fact that its torque is weak, and the control of the revolution speed is impossible, thereby making its applicability very limited.

SUMMARY OF THE INVENTION

Therefore it is the object of the present invention to provide an induction motor in which all the above described disadvantages of the conventional motors are overcome.

In achieving the above mentioned object, the device according to the present invention includes a rotor having coils and a commutator mounted within a stator, and the stator has a pair of crescent-shaped pole pieces.

BRIEF DESCRIPTION OF THE DRAWINGS

The above object and other advantages of the present invention will become more apparent by describing the preferred embodiment of the present invention with reference to the attached drawings in which:

FIG. 1 is two elevational views of the rotor and stator of conventional electric motors, in which

FIG. 4 is a fragmentary perspective view of the assembling process for the stator and end cover of the induction motor shown in FIG. 2; and FIGS. 5A, 5B and 5C show other embodiments of the induction motor according to the present invention.

DESCRIPTION OF THE PREFERRED EMBODIMENTS

Figure 1A:
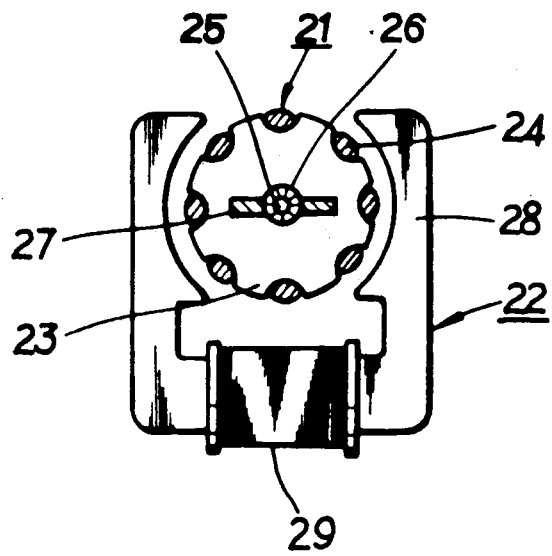
FIG. 1A shows a straight winding type motor.
Figure 1B:
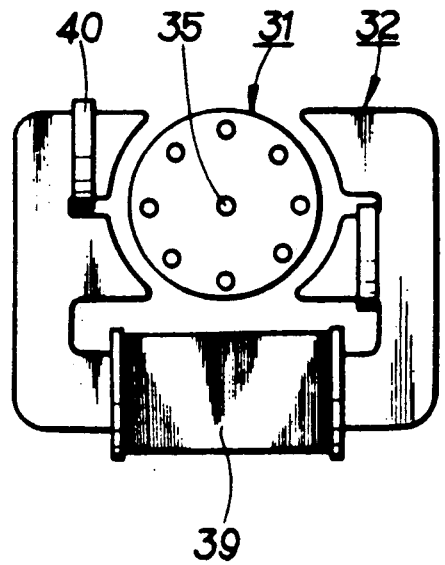
FIG. 1B shows an induction motor.
Figure 2:
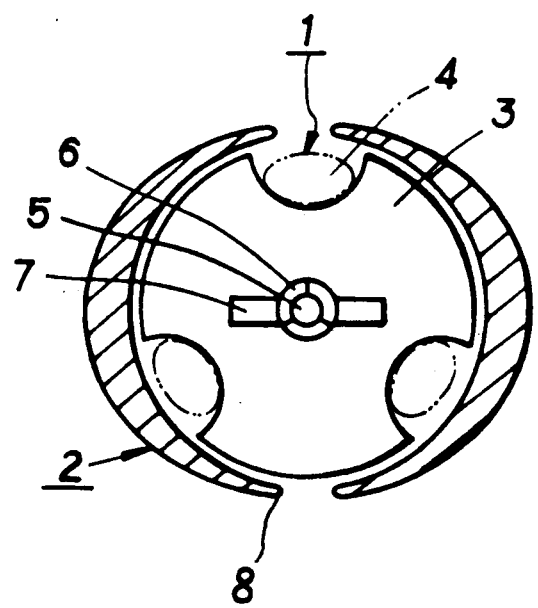
FIG. 2 is a cross sectional view of the rotor and stator of an induction motor according to the present invention.

As shown in the FIGS. 2–4, coils 4 are wound on a rotor core 3 which is installed on a shaft 5 to form a rotor 1. A commutator 6 having as many poles as the poles of the rotor (FIG. 2 illustrates three poles, but the number of the poles can be increased depending on the required revolution speed and torque) is also fixedly installed on the shaft 5, the divided respective segments of the commutator being connected to the respective rotor coils to complete a rotor 1. Brushes 7 are provided to supply electric current through the commutator 6 to the rotor coils 4. A pair of stator pieces 2 are crescent-shaped in cross section, each having a larger thickness at the center and smaller thickness at the outer opposite longitudinal edges 8 thereof (the ratio of the thicknesses between the center and the opposite edges being desirable if it is more than 2.0), are positioned adjacent to and partially enclosing the rotor 1. The stator pieces 2 can be made of a ferromagnetic material, typically ordinary steel core material used in this field such as chrome steel and the like.

The reason for the smaller thickness at the opposite edges 8 of the stator 2 is to increase the magnetic flux density at the edges 8 because the magnetization is concentrated there. Further, the number of the stator pieces can be increased to over three.

Figure 3A:
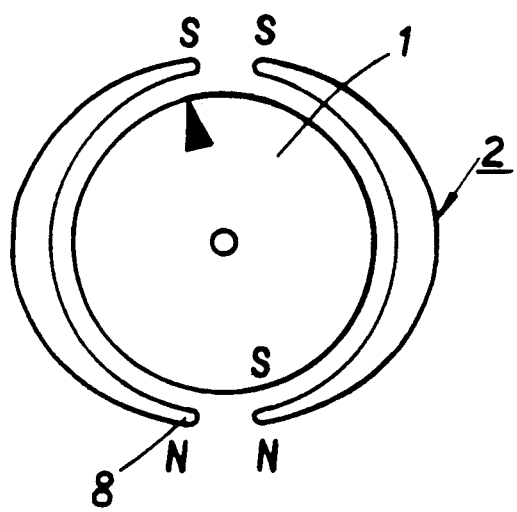
FIGS. 3 is a schematic representation of the operation of the induction motor shown in FIG. 2 in four positions A-D.
Figure 3B:
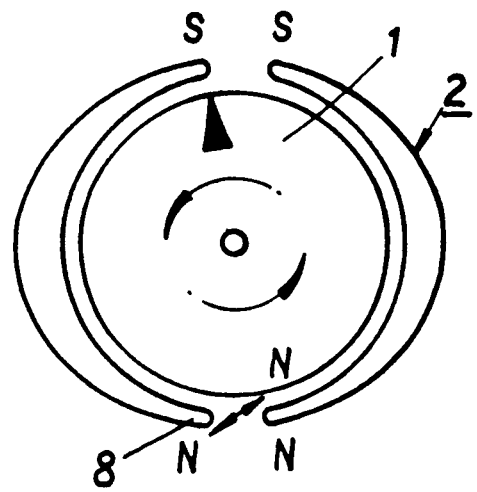

The magnetizing type induction motor according to the present invention and constructed as shown is operated as follows. (In FIG. 3, the black triangle shows the relative positions of the revolving rotor, and the following description is referenced to the diagonal positions of the rotor 1 indicated by the black triangle.) First, in FIG. 3A, if a polar position opposite the black triangle on the rotor 1 is magnetized as an S (South) pole by alternating electric current (AC) flowing through the brush 7 and the commutator 6, then the directly adjacent portions of the edges 8 of the stator 2 are magnetized by induction as N (North) poles. Then, as the polarity of the current is reversed at the next moment, the polar position on the rotor is magnetized as an N pole as shown in FIG. 3B, with the result that it creates a repulsing interaction with the N pole edges 8 of the crescent-shaped stators 2, and the rotor 1 is caused to rotate counterclockwise. At the same time, the magnetic polarity of the edge 8 of the crescent shaped stator 2 is reversed to an S pole by the adjacent N pole on the rotor.

Figure 3C:
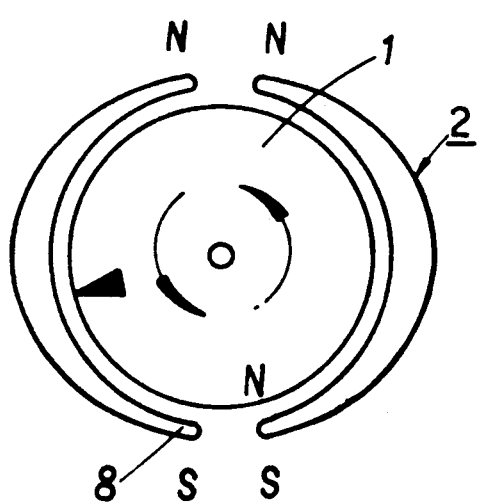
Figure 3D:
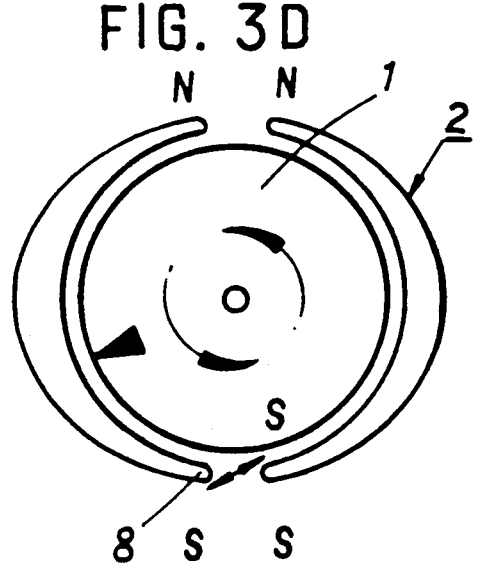

When the next N polar portion of the rotor 1 rotates to the same position, as shown in FIG. 3C, the magnetic polarity is reversed again to an S pole by the changing current with the result that the rotor 1 undergoes the same repulsing interaction (FIG. 3D), so that the rotor 1 should revolve continuously through the repetition of the same repulsing interactions.

Meanwhile, in the case where the supplied current is a direct current (DC), if an external force is applied to make the rotor rotate slightly, then the rotor can be made to continuously revolve by means of the discontinuous supplying of the electric current, such discontinuity of the current being caused by the commutator 6. That is, if a polar portion of the rotor is magnetized as an N pole, the adjacent edge 8 of the crescent shaped stator 2 is magnetized as an S pole, and if an external revolving force is applied so as to move the next polar portion to the same position, then the induction motor according to the present invention can be made to continuously revolve. Thus, unlike in the conventional motors, the magnetizing type induction motor according to the present invention can use both AC and DC currents.

FIGS. 4 and 5 show the various embodiments for carrying out the present invention based on the principle described above. As shown in FIG. 4, an end cover 9 made of a non-magnetic and electrically non-conductive material such as plastic is provided with a pair of fitting grooves 10, and a pair of the crescent-shaped stators 2 are fitted into the fitting grooves, thereby excluding the need of a separate outer casing to support the stators. Further, as shown in FIG. 5A, a pair of coupling pins 11, having an approximately H-shaped cross section defining a longitudinally extending insertion slot 12 and a hooking tip 13, can be provided to engage the edges 8 of the crescent moon-shaped stator 2 and attach to a pair of end covers. One end of the pin 11 can be attached to an end cover plate 9A and the opposite hook end attached to an end cover plate 9B by engaging the hooking tip 13 in a fitting slot 14.

In an another embodiment shown in FIG. 5B, a pair of fixing pieces 15 can be used to attach the crescent-shaped stators 2 to an interior wall of a casing C. In such a case, the gap t2 between the crescent-shaped stator 2 and the interior wall of the casing C should be much larger than the gap t1 between the exterior surface of the rotor 1 and the crescent shaped stator 2, if the interference phenomenon due to the magnetization of the casing C is to be avoided so that the operation of the motor should not be impeded by such interference phenomenon.

Further, in another embodiment of the present invention shown in FIG. 3C, the casing and the crescent shaped stators can be integrally formed by providing a connecting portion 16 through the process of die casting and the like to form a unitized stator-casing body 17. Here, the arcuate length t of the connecting portion 16 should be desirably larger than the maximum thickness t' of the stator, while the distance between the casing C and the rotor 1 is not an important factor.

Among the above described embodiments of the present invention, the embodiments shown in FIGS. 4 and 5A are desirably applicable to small motors, while the embodiments of FIGS. 5B and 5C are respectively desirably applicable to medium and large motors.

The induction motor of the present invention as described above has the advantages that the volume of the coils is reduced, a casing is not required, and the structure is very simple. Therefore, the manufacturing cost can be reduced, and miniaturization of the motor is possible. Further the magnetizing type induction motor according to the present invention can use both AC and DC electrical power as contrasted with the conventional motors. Further, the device of the present invention does not require frequent maintenance, and therefore, it can be reliably used in automated apparatuses.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A magnetizing type induction motor having a coil-wound rotor and a commutator installed on a shaft comprising:
    at least two stator pieces positioned about an exterior surface of the rotor, each said stator piece having a crescent-shaped cross section and being formed of a non-magnetized ferromagnetic material, the thickness of a center portion of each said stator piece being larger than the thickness of opposite longitudinal edges of said stator piece.

2. The magnetizing type induction motor as claimed in claim 1 including a pair of end covers formed of a non-magnetic and electrically non-conductive material each provided with a pair of fitting grooves for receiving ends of and securing said crescent-shaped stator pieces together.

3. The magnetizing type induction motor as claimed in claim 2 including a coupling pin having at least one longitudinally extending insertion slot formed therein for retaining one of said longitudinal edges of said stator pieces, one end of said pin being adapted to be attached to one of said end covers, and the other end of said pin having a hook adapted for engaging a fitting slot which is formed in the other one of said end covers.

4. The magnetizing type induction motor as claimed in claim 1 including a casing for enclosing said stator pieces and a fixing piece for attaching an associated one of said stator pieces to an interior wall of said casing.

5. The magnetizing type induction motor as claimed in claim 1 wherein said stator pieces are formed integrally with a casing, said stator pieces being enclosed by said casing and connected to an interior wall of said casing by connecting portions forming a unitized stator-casing body.

6. A magnetizing type induction motor having a coil-wound rotor and a commutator installed on a shaft comprising:
    a pair of stator pieces positioned about an exterior surface of the rotor, each said stator piece having a crescent-shaped cross section and being formed of a non-magnetized ferromagnetic material, the thickness of a center portion of each said stator piece being larger than the thickness of opposite longitudinal edges of said stator piece.

7. The magnetizing type induction motor as claimed in claim 6 including a pair of end covers formed of a non-magnetic and electrically non-conductive material each provided with a pair of fitting grooves for receiving ends of and securing said crescent-shaped stator pieces together.

8. The magnetizing type induction motor as claimed in claim 7 including a pair of coupling pins each having a pair of longitudinally extending insertion slots formed therein for retaining said longitudinal edges of said stator pieces, one end of each said pin being adapted to be attached to one of said end covers, and the other end of each said pin having a hook adapted for engaging an associated fitting slot which is formed in the other one of said end covers.

9. The magnetizing type induction motor as claimed in claim 6 including a casing for enclosing said stator pieces and a pair of fixing pieces each for attaching an associated one of said stator pieces to an interior wall of said casing.

10. The magnetizing type induction motor as claimed in claim 6 wherein said stator pieces are formed integrally with a casing, said stator pieces being enclosed by said casing and connected to an interior wall of said casing by connecting portions forming a unitized stator-casing body.

11. A magnetizing type induction motor comprising:
a shaft;
a coil-wound rotor mounted on said shaft;
a commutator mounted on said shaft and electrically connected to coils on said rotor; and
at least two stator pieces positioned about an exterior surface of said rotor, each said stator piece having a crescent-shaped cross section and being formed of a non-magnetized ferromagnetic material, the thickness of a center portion of each said stator piece being larger than the thickness of opposite longitudinal edges of said stator piece.

* * * * *